(12) United States Patent
Saxena et al.

(10) Patent No.: US 7,650,533 B1
(45) Date of Patent: Jan. 19, 2010

(54) METHOD AND SYSTEM FOR PERFORMING A RESTORATION IN A CONTINUOUS DATA PROTECTION SYSTEM

(75) Inventors: Pawan Saxena, Sunnyvale, CA (US); Yafen Peggy Chang, Sunnyvale, CA (US); Roger Keith Stager, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 609 days.

(21) Appl. No.: 11/408,198

(22) Filed: Apr. 20, 2006

(51) Int. Cl.
*G06F 11/00* (2006.01)
(52) U.S. Cl. .......................................... 714/6; 714/13
(58) Field of Classification Search .................. 714/6, 714/5, 11–13, 42, 54; 707/200, 202, 204
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,235,695 A | 8/1993 | Pence | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,643 A | 6/1998 | Lubbers et al. | |
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,854,720 A | 12/1998 | Shrinkle et al. | |
| 5,864,346 A | 1/1999 | Yokoi et al. | |
| 5,872,669 A | 2/1999 | Morehouse et al. | |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 5,974,424 A | 10/1999 | Schmuck et al. | |
| 6,021,408 A | 2/2000 | Ledain et al. | |

(Continued)

FOREIGN PATENT DOCUMENTS

EP 1333379 4/2006

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner*—Dieu-Minh Le
(74) *Attorney, Agent, or Firm*—Perkins Coie LLP

(57) ABSTRACT

A method for restoring a volume in a continuous data protection system begins by selecting a volume to restore. The selected volume is loaded into a workspace. The selected volume is copied from the workspace to a restore location. Operations are simultaneously performed on the selected volume while the selected volume is being copied. The selected volume is accessed on the restore location once the copying is complete.

32 Claims, 11 Drawing Sheets

U.S. PATENT DOCUMENTS

| | | | |
|---|---|---|---|
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,163,856 A | 12/2000 | Dion et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,877,016 B1 | 4/2005 | Hart et al. | |
| 6,907,507 B1 * | 6/2005 | Kiselev et al. | 711/162 |
| 6,915,397 B2 | 7/2005 | Lubbers et al. | |
| 6,931,557 B2 | 8/2005 | Togawa | |
| 6,950,263 B2 | 9/2005 | Suzuki et al. | |
| 6,973,369 B2 | 12/2005 | Trimmer et al. | |
| 6,973,534 B2 | 12/2005 | Dawson | |
| 6,978,325 B2 | 12/2005 | Gibble | |
| 7,032,126 B2 | 4/2006 | Zalewski et al. | |
| 7,055,009 B2 | 5/2006 | Factor et al. | |
| 7,072,910 B2 | 7/2006 | Kahn et al. | |
| 7,089,385 B1 * | 8/2006 | Kiselev et al. | 711/162 |
| 7,096,331 B1 | 8/2006 | Haase et al. | |
| 7,100,089 B1 | 8/2006 | Phelps | |
| 7,111,136 B2 | 9/2006 | Yamagami | |
| 7,127,388 B2 | 10/2006 | Yates et al. | |
| 7,127,577 B2 | 10/2006 | Koning et al. | |
| 7,149,858 B1 * | 12/2006 | Kiselev | 711/162 |
| 7,152,077 B2 | 12/2006 | Veitch et al. | |
| 7,155,586 B1 | 12/2006 | Wagner et al. | |
| 7,299,332 B1 * | 11/2007 | Misra et al. | 711/170 |
| 7,318,134 B1 * | 1/2008 | Oliveira et al. | 711/162 |
| 2001/0047447 A1 | 11/2001 | Katsuda | |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0095557 A1 | 7/2002 | Constable et al. | |
| 2002/0144057 A1 | 10/2002 | Li et al. | |
| 2002/0163760 A1 | 11/2002 | Lindsey et al. | |
| 2002/0166079 A1 | 11/2002 | Ulrich et al. | |
| 2002/0199129 A1 | 12/2002 | Bohrer et al. | |
| 2003/0004980 A1 | 1/2003 | Kishi et al. | |
| 2003/0037211 A1 | 2/2003 | Winokur | |
| 2003/0120476 A1 | 6/2003 | Yates et al. | |
| 2003/0120676 A1 | 6/2003 | Holavanahalli et al. | |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0182301 A1 | 9/2003 | Patterson et al. | |
| 2003/0182350 A1 | 9/2003 | Dewey | |
| 2003/0188208 A1 | 10/2003 | Fung | |
| 2003/0217077 A1 | 11/2003 | Schwartz et al. | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0181388 A1 | 9/2004 | Yip et al. | |
| 2004/0181707 A1 | 9/2004 | Fujibayashi | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Perry | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |

FOREIGN PATENT DOCUMENTS

| | | |
|---|---|---|
| EP | 1 671 231 | 6/2006 |
| WO | WO99/03098 | 1/1999 |
| WO | WO99/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Continuous Data Protection: Business Continuity for the Era of Networked Storage: An Executive White Paper" Aberdeen Group, Inc., Jul. 2003.

"Alacritus Software's Chronospan: Make Time for Continuous Data Protection" Aberdeen Group, Inc., Oct. 2003.

Hill, David "Alacritus Software's Securitus: Defining the Way to Virtual Tape Libraries" Aberdeen Group, Inc., Jul. 2003.

"Product Brief: Rhapsody/Alacritus-Secritus/XPath Virtual Tape in the Fabric" The Enterprise Storage Group, Aug. 2002.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library Support for Legato NetWorker Data Protection Solution" Alacritus Software, Inc., Jan. 8, 2002.

Camphuisen, Alicia, "Hitachi Inks OEM Deal with Legato" Knapp Comm., Jul. 17, 2002.

"Alacritus Announces Disk-Based Successor to Tape" Knapp Comm., Aug. 21, 2002.

Biggar, Heidi, "Alacritus Enables Disk-Based Backup" InfoStor, Sep. 2001.

"Securitus I White Paper: Disk Based Data Protection from Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Virtual Tape Library Technology Brochure" Alacritus Software, Inc., Jul. 2001.

"Disk-Based Data Protection" Alacritus Software, Inc., Sep. 2001.

"Disk-Based Data Protection" Alacritus Software, Inc., Sep. 2002.

Payack, Paul JJ, "Alacritus Lines Up OEM Partners for Virtual Tape Library Push" The (451) Storage & Systems, Oct. 4, 2002.

Payack, Paul JJ, "Alacritus Software Announces Continuous Data Protection with New Chronospan Technology" Oct. 28, 2003.

Payack, Paul JJ, "Alacritus Software Announces New Customers for Securitus VTLA" Alacritus Software, Jan. 13, 2004.

Baltazar, Henry "Weaving Apps Into SAN Fabric" eWEEK, Mar. 24, 2003.

Baltazar, Henry "More Intelligence is on the Way" eWEEK, Sep. 15, 2003.

Barrett, Alex "The Case for Network Smarts" Storage Magazine, Jun. 2003.

"Securitus White Paper: Disk Based Data Protection from Alacritus Software" Alacritus Website, Oct. 2003.

"Manageability: Securitus v. Tape" Alacritus Website, Oct. 2003.

"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.

"No Changes Required: Securitus v. Tape" Alacritus Website, Oct. 2003.

"Customer Success" Alacritus Website, Oct. 2003.

"Chronospan" Alacritus Website, Oct. 2003.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnership in Backup Arena" InfoStor, Nov. 2001.

Preston, W. Curtis, "Surprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.

Komiega, Kevin, "Vendor Pushes Disk Backup Over Tape" SearchStorage.com Jan. 10, 2003.

"Testimonials" Alacritus Website, Oct. 2003.

"Seamless Integration" Alacritus Website, Oct. 2003.

"Topologies" Alacritus Website, Oct. 7, 2003.

"Securitus" Alacritus Website, Oct. 2003.

"Scalability: Securitus v. Tape" Alacritus Website, Oct. 2003.

"Strengths: Securitus v. Tape" Alacritus Website, Oct. 2003.

"Alacritus Creates 'Next Critical Step' in Disaster Recovery for Patrick Air Force Base, Securitus VTL Sets the Pace", Apr. 20, 2004.

"Alacritus to Demonstrate Chronospan CDP with the Brocade Fabric Application Platform at Storage Networking World", Apr. 1, 2004.

"Alacritus to Demo Chronospan Continuous Data Protection with the Cisco MDS 9000", Apr. 1, 2004.

"Alacritus and Network Appliance Deliver Advanced Virtual Tape Library, Solution Shortens Backup Windows, Accelerates Data Recovery, and Simplifies Backup Management", Dec. 7, 2004.

"Cisco and Storage ISVs to Demo Protocol-Based Interface between Storage Appliances and the Cisco MDS 9000", Mar. 30, 2004.

"Case Study Shizuoka-ken Noukyou Densan Center K.K., Reducing Management Costs Through Tapeless Backup At An iDC", Apr. 7, 2004.

* cited by examiner

METHOD AND SYSTEM FOR PERFORMING A RESTORATION IN A CONTINUOUS DATA PROTECTION SYSTEM

FIELD OF INVENTION

The present invention relates generally to continuous data protection, and more particularly, to restoring a volume in a continuous data protection system.

BACKGROUND

Hardware redundancy schemes have traditionally been used in enterprise environments to protect against component failures. Redundant arrays of independent disks (RAID) have been implemented successfully to assure continued access to data even in the event of one or more media failures (depending on the RAID Level). Unfortunately, hardware redundancy schemes are ineffective in dealing with logical data loss or corruption. For example, an accidental file deletion or virus infection is automatically replicated to all of the redundant hardware components and can neither be prevented nor recovered from by such technologies. To overcome this problem, backup technologies have traditionally been deployed to retain multiple versions of a production system over time. This allowed administrators to restore previous versions of data and to recover from data corruption.

Backup copies are generally policy-based, are tied to a periodic schedule, and reflect the state of a primary volume (i.e., a protected volume) at the particular point in time that is captured. Because backups are not made on a continuous basis, there will be some data loss during the restoration, resulting from a gap between the time when the backup was performed and the restore point that is required. This gap can be significant in typical environments where backups are only performed once per day. In a mission-critical setting, such a data loss can be catastrophic. Beyond the potential data loss, restoring a primary volume from a backup system can be complicated and often takes many hours to complete. This additional downtime further exacerbates the problems associated with a logical data loss.

The traditional process of backing up data to tape media is time driven and time dependent. That is, a backup process typically is run at regular intervals and covers a certain period of time. For example, a full system backup may be run once a week on a weekend, and incremental backups may be run every weekday during an overnight backup window that starts after the close of business and ends before the next business day. These individual backups are then saved for a predetermined period of time, according to a retention policy. In order to conserve tape media and storage space, older backups are gradually faded out and replaced by newer backups. Further to the above example, after a full weekly backup is completed, the daily incremental backups for the preceding week may be discarded, and each weekly backup may be maintained for a few months, to be replaced by monthly backups. The daily backups are typically not all discarded on the same day. Instead, the Monday backup set is overwritten on Monday, the Tuesday backup set is overwritten on Tuesday, and so on. This ensures that a backup set is available that is within eight business hours of any corruption that may have occurred in the past week.

Despite frequent hardware failures and the necessity of ongoing maintenance and tuning, the backup creation process can be automated, while restoring data from a backup remains a manual and time-critical process. First, the appropriate backup tapes need to be located, including the latest full backup and any incremental backups made since the last full backup. In the event that only a partial restoration is required, locating the appropriate backup tape can take just as long. Once the backup tapes are located, they must be restored to the primary volume. Even under the best of circumstances, this type of backup and restore process cannot guarantee high availability of data.

Another type of data protection involves making point in time (PIT) copies of data. A first type of PIT copy is a hardware-based PIT copy, which is a mirror of the primary volume onto a secondary volume. The main drawbacks to a hardware-based PIT copy are that the data ages quickly and that each copy takes up as much disk space as the primary volume. A software-based PIT, typically called a "snapshot," is a "picture" of a volume at the block level or a file system at the operating system level. Various types of software-based PITs exist, and most are tied to a particular platform, operating system, or file system. These snapshots also have drawbacks, including occupying additional space on the primary volume, rapid aging, and possible dependencies on data stored on the primary volume wherein data corruption on the primary volume leads to corruption of the snapshot. In addition, snapshot systems generally do not offer the flexibility in scheduling and expiring snapshots that backup software provides.

While both hardware-based and software-based PIT techniques reduce the dependency on the backup window, they still require the traditional tape-based backup and restore process to move data from disk to tape media and to manage the different versions of data. This dependency on legacy backup applications and processes is a significant drawback of these technologies. Furthermore, like traditional tape-based backup and restore processes, PIT copies are made at discrete moments in time, thereby limiting any restores that are performed to the points in time at which PIT copies have been made.

A need therefore exists for a system that combines the advantages of tape-based systems with the advantages of snapshot systems and eliminates the limitations described above.

SUMMARY

The present invention relates to a system and method for continuously backing up data, allowing system administrators to pause, rewind, and replay live enterprise data streams. This moves the traditional backup methodologies into a continuous background process in which pre-defined policies can automatically manage the lifecycle of many generations of backup data.

A method for restoring a volume in a continuous data protection system begins by selecting a volume to restore. The selected volume is loaded into a workspace. The selected volume is copied from the workspace to a restore location. Operations are simultaneously performed on the selected volume while the selected volume is being copied. The selected volume is accessed on the restore location once the copying is complete.

A system for restoring a volume in a continuous data protection system includes a host device, a restore location on which the volume is to be restored, a workspace in the data protection system, copying means, and operating means. The workspace is configured to receive a selected volume to be restored. The copying means copies the selected volume from the workspace to the restore location. The operating means simultaneously performs an operation from the host device on the selected volume while the selected volume is being copied from the workspace to the restore location.

A computer-readable storage medium containing a set of instructions for a general purpose computer, the set of instructions including a selecting code segment for selecting a volume to restore; a loading code segment for loading the selected volume into a workspace; a copying code segment for copying the selected volume from the workspace to a restore location; an operation code segment for simultaneously performing operations on the selected volume while the selected volume is being copied; and an accessing code segment for accessing the selected volume on the restore location once the selected volume has been copied.

A system for restoring a volume in a continuous data protection system includes a host device, a restore location on which the volume is to be restored, a workspace, a copying device, and a processor. The workspace is located in the data protection system and is configured to receive a selected volume to be restored. The copying device is configured to copy the selected volume from the workspace to the restore location. The processor is configured to simultaneously perform an operation from the host device on the selected volume while the selected volume is being copied from the workspace to the restore location.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

In the present invention, data is backed up continuously, allowing system administrators to pause, rewind, and replay live enterprise data streams. This moves the traditional backup methodologies into a continuous background process in which policies automatically manage the lifecycle of many generations of restore images.

System Construction

Figure 1A:
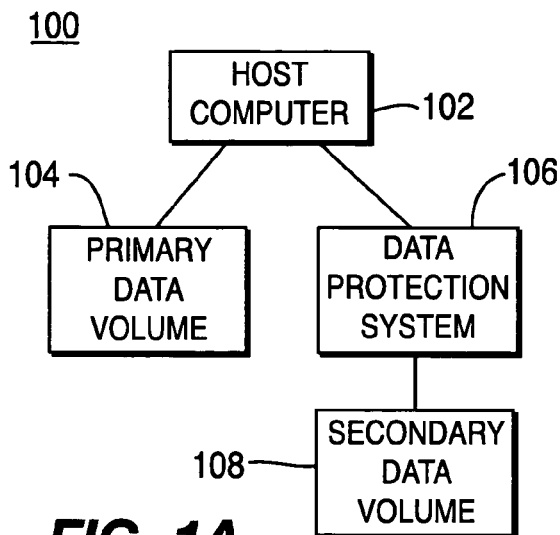
FIGS. 1A-1C are block diagrams showing different embodiments of a continuous data protection environment.

FIG. 1A shows a preferred embodiment of a protected computer system 100 constructed in accordance with the present invention. A host computer 102 is connected directly to a primary data volume 104 (the primary data volume may also be referred to as the protected volume) and to a data protection system 106. The data protection system 106 manages a secondary data volume 108. The construction of the system 100 minimizes the lag time in writing to the secondary data volume 108 by writing directly to the primary data volume 104. This construction permits the data protection system 106 to focus exclusively on managing the secondary data volume 108. The management of the secondary volume 108 is preferably performed using a volume manager.

A volume manager is a software module that runs on a server or intelligent storage switch to manage storage resources. Typical volume managers have the ability to aggregate blocks from multiple different physical disks into one or more virtual volumes. Applications are not aware that they are actually writing to segments of many different disks because they are presented with one large, contiguous volume. In addition to block aggregation, volume managers usually also offer software RAID functionality. For example, they are able to split the segments of the different volumes into two groups, where one group is a mirror of the other group. This is, in a preferred embodiment, the feature that the data protection system is taking advantage of when the present invention is implemented as shown in FIG. 1A. In many environments, the volume manager or host-based driver already mirrors the writes to two distinct different primary volumes for redundancy in case of a hardware failure. The present invention is configured as a tertiary mirror target in this scenario, such that the volume manager or host-based driver also sends copies of all writes to the data protection system.

It is noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the structure of the data stored at each location, as will be explained in detail below. It is noted that there may also be differences in terms of the technologies that are used. The primary volume 104 is typically an expensive, fast, and highly available storage subsystem, whereas the secondary volume 108 is typically cost-effective, high capacity, and comparatively slow (for example, ATA/SATA disks). Normally, the slower secondary volume cannot be used as a synchronous mirror to the high-performance primary volume, because the slower response time will have an adverse impact on the overall system performance.

The data protection system 106, however, is optimized to keep up with high-performance primary volumes. These optimizations are described in more detail below, but at a high level, random writes to the primary volume 104 are processed sequentially on the secondary volume 108. Sequential writes improve both the cache behavior and the actual volume performance of the secondary volume 108. In addition, it is possible to aggregate multiple sequential writes on the secondary volume 108, whereas this is not possible with the random writes to the primary volume 104. The present invention does not require writes to the data protection system 106 to be synchronous. However, even in the case of an asynchronous mirror, minimizing latencies is important.

Figure 1B:
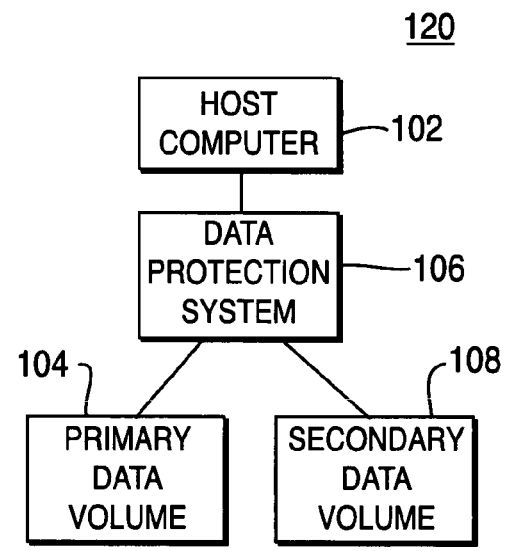

FIG. 1B shows an alternate embodiment of a protected computer system 120 constructed in accordance with the present invention. The host computer 102 is directly connected to the data protection system 106, which manages both the primary data volume 104 and the secondary data volume 108. The system 120 is likely slower than the system 100 described above, because the data protection system 106 must manage both the primary data volume 104 and the secondary data volume 108. This results in a higher latency for writes to the primary volume 104 in the system 120 and lowers the available bandwidth for use. Additionally, the introduction of a new component into the primary data path is undesirable because of reliability concerns.

Figure 1C:
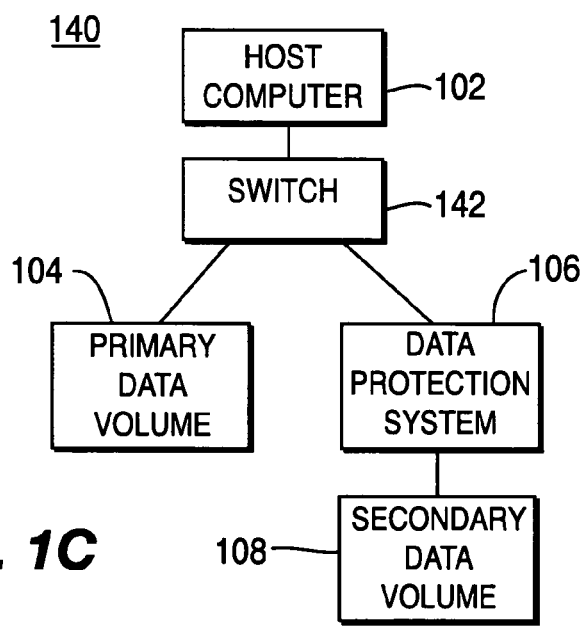

FIG. 1C shows another alternate embodiment of a protected computer system 140 constructed in accordance with the present invention. The host computer 102 is connected to a switch 142. The switch 142 is connected to the primary data volume 104 and the data protection system 106, which in turn manages the secondary data volume 108. The switch 142 includes the ability to host applications and contains some of the functionality of the data protection system 106 in hardware, to assist in reducing system latency and improve bandwidth.

It is noted that the data protection system 106 operates in the same manner, regardless of the particular construction of the protected computer system 100, 120, 140. The major difference between these deployment options is the manner and place in which a copy of each write is obtained. To those skilled in the art it is evident that other embodiments, such as the cooperation between a switch platform and an external server, are also feasible.

Conceptual Overview

To facilitate further discussion, it is necessary to explain some fundamental concepts associated with a continuous data protection system constructed in accordance with the present invention. In practice, certain applications require continuous data protection with a block-by-block granularity, for example, to rewind (i.e., "undo") individual transactions. However, the period in which such fine granularity is required is generally short (for example, two days), which is why the system can be configured to fade out data over time. The present invention discloses data structures and methods to manage this process automatically.

The present invention keeps a log of every write made to a primary volume (a "write log") by duplicating each write and directing the copy of the write to a cost-effective secondary volume in a sequential fashion. The write log needs to be at least as large as the primary volume it is associated with. In a preferred embodiment, the write log is five times the size of the primary volume. It is noted that there is no upper limit on the size of the write log, and that the value of five times the size is merely exemplary.

The resulting write log on the secondary volume can then be played back one write at a time (i.e., a rollback operation) to recover the state of the primary volume at any previous point in time. This rollback operation may also be referred to as a "partial restore" operation. Replaying the write log one write at a time is very time consuming, particularly if a large amount of write activity has occurred since the creation of the write log. In typical recovery scenarios, it is necessary to examine how the primary volume looked like at multiple points in time before deciding which point to recover to. For example, consider a system that was infected by a virus. In order to recover from the virus, it is necessary to examine the primary volume as it was at different points in time to find the latest recovery point where the system was not yet infected by the virus. Additional data structures are needed to efficiently compare multiple potential recovery points. One data structure suitable for this purpose is a delta map.

Delta Maps

Delta maps provide a mechanism to efficiently recover the primary volume as it was at a particular point in time without the need to replay the write log in its entirety, one write at a time. In particular, delta maps are data structures that keep track of data changes between two points in time. These data structures can then be used to selectively play back portions of the write log such that the resulting point-in-time image is the same as if the log were played back one write at a time, starting at the beginning of the log.

Figure 2:
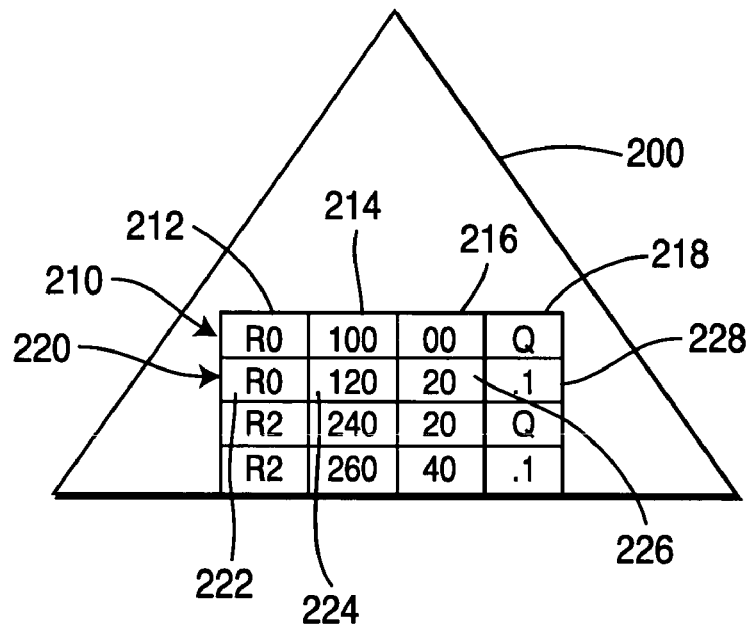
FIG. 2 is an example of a delta map.

FIG. 2 shows a delta map 200 constructed in accordance with the present invention. While the format shown in FIG. 2 is preferred, any format containing similar information may be used. For each write to a primary volume, a duplicate write is made, in sequential order, to a secondary volume. To create a mapping between the two volumes, it is preferable to have an originating entry and a terminating entry for each write. The originating entry includes information regarding the origination of a write, while the terminating entry includes information regarding the termination of a write.

As shown in delta map 200, row 210 is an originating entry and row 220 is a terminating entry. Row 210 includes a field 212 for specifying the region of a primary volume where the first block was written, a field 214 for specifying the block offset in the region of the primary volume where the write begins, a field 216 for specifying where on the secondary volume the duplicate write (i.e., the copy of the primary volume write) begins, and a field 218 for specifying the physical device (the physical volume or disk identification) used to initiate the write. Row 220 includes a field 222 for specifying the region of the primary volume where the last block was written, a field 224 for specifying the block offset in the region of the primary volume where the write ends, a field 226 for specifying the where on the secondary volume the duplicate write ends, and a field 228. While fields 226 and 228 are provided in a terminating entry such as row 220, it is noted that field 226 is optional because this value can be calculated by subtracting the offsets of the originating entry and the terminating entry (field 226=(field 224−field 214)+field 216), and field 228 is not necessary since there is no physical device usage associated with termination of a write.

In a preferred embodiment, as explained above, each delta map contains a list of all blocks that were changed during the particular time period to which the delta map corresponds. That is, each delta map specifies a block region on the primary volume, the offset on the primary volume, and physical device information. It is noted, however, that other fields or a completely different mapping format may be used while still achieving the same functionality. For example, instead of dividing the primary volume into block regions, a bitmap could be kept, representing every block on the primary volume. Once the retention policy (which is set purely according to operator preference) no longer requires the restore granularity to include a certain time period, corresponding blocks that are not needed for recovery points are freed up. Once a particular delta map expires, its block list is returned to the appropriate block allocator for re-use.

Delta maps are initially created from the write log using a map engine, and can be created in real-time, after a certain number of writes, or according to a time interval. It is noted that these are examples of ways to trigger the creation of a delta map, and that one skilled in the art could devise various other triggers. Additional delta maps may also be created as a result of a merge process (called "merged delta maps") and may be created to optimize the access and restore process. The delta maps are stored on the secondary volume and contain a mapping of the primary address space to the secondary address space. The mapping is kept in sorted order based on the primary address space.

One significant benefit of merging delta maps is a reduction in the number of delta map entries that are required. For example, when there are two writes that are adjacent to each other on the primary volume, the terminating entry for the first write can be eliminated from the merged delta map, since its location is the same as the originating entry for the second write. The delta maps and the structures created by merging maps reduces the amount of overhead required in maintaining the mapping between the primary and secondary volumes.

Retention Policy

Figure 3:
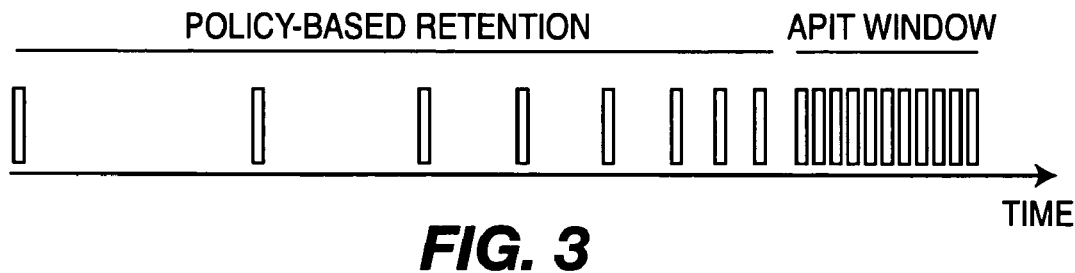
FIG. 3 is a diagram illustrating a retention policy for the fading out of snapshots.

FIG. 3 shows a diagram of a retention policy used in connection with fading out (i.e., deleting) any point in time (APIT) snapshots over time. The retention policy consists of several parts. One part is used to decide how large the APIT window is and another part decides when to take scheduled snapshots and for how long to retain them. Each scheduled snapshot consists of all the changes up to that point in time; over longer periods of time, each scheduled snapshot will contain the changes covering a correspondingly larger period of time, with the granularity of more frequent snapshots being unnecessary.

It is noted that outside the APIT window (the left portion of FIG. 3), some data will be phased out (shown by the gaps on the left portion of FIG. 3). Deciding which data to phase out is similar to a typical tape rotation scheme. A policy is entered by the user that decides to retain data that was recorded, for example, at each minute boundary. It is also noted that the present invention provides versioning capabilities with respect to snapshots (i.e., file catalogs, scheduling capabilities, etc.) as well as the ability to establish compound/aggregate policies, etc. when outside an APIT window.

Data Recovery

Data is stored in a block format, and delta maps can be merged to reconstruct the full primary volume as it looked like at a particular point in time. Users need to be able to access this new volume seamlessly from their current servers. There are two ways to accomplish this at a block level. The first way is to mount the new volume (representing the primary volume at a previous point in time) to the server. The problem with this approach is that it can be a relatively complex configuration task, especially since the operation may need to be performed under time pressure and during a crisis situation, i.e., during a system outage. However, some systems now support dynamic addition and removal of volumes, so this may not be a concern in some situations.

The second way to access the recovered primary volume is to treat the recovered volume as a piece of removable media (e.g., a CD), that is inserted into a shared removable media drive. In order to properly recover data from the primary volume at a previous point in time, an image of the primary volume is loaded onto a location on the network, each location having a separate identification known as a logical unit number (LUN). This image of the primary volume can be built by accessing a previously stored snapshot.

Full Restore

The idea of a full restore is that once a user has selected a particular snapshot, the corresponding content (i.e., the new volume) is moved to the primary volume, overwriting the (possibly corrupted) contents there. If a host-based agent or service on a storage switch is used, requests to regions that have already been copied to the primary volume can be served from there (and thus faster), whereas requests for blocks that have not yet been copied are served from the secondary volume. This makes the restore process invisible to the user, with the only noticeable difference being that initial requests may be a bit slower than usual.

The full restore procedure is used to restore the primary volume image to an image at some previous point in time. This operation can be performed on an existing primary volume or on a completely new primary volume. Performing a full restore to an existing primary volume requires a rollback operation, where only the data blocks that have changed since the requested restore PIT are restored on the original primary volume. During the rollback operation, all of the data blocks pointed to by a delta map are copied to the original volume. Performing a full restore to a new primary volume requires a full PIT image of the primary volume, which is represented by a PIT map. During the full restore operation, all of the data represented by the PIT map is copied to the primary volume.

The full restore process includes two components: (1) a Writable Restore LUN (WRL), which presents the snapshot of the primary volume at a certain PIT; and (2) a Mirror Agent, which is a software element that runs either on the host or inside a switch. It is used to intercept the write activity to the primary volume and send a copy of the write to the WRL. During the full restore process, the mirror agent also intercepts the reads to the primary volume.

Figure 4:
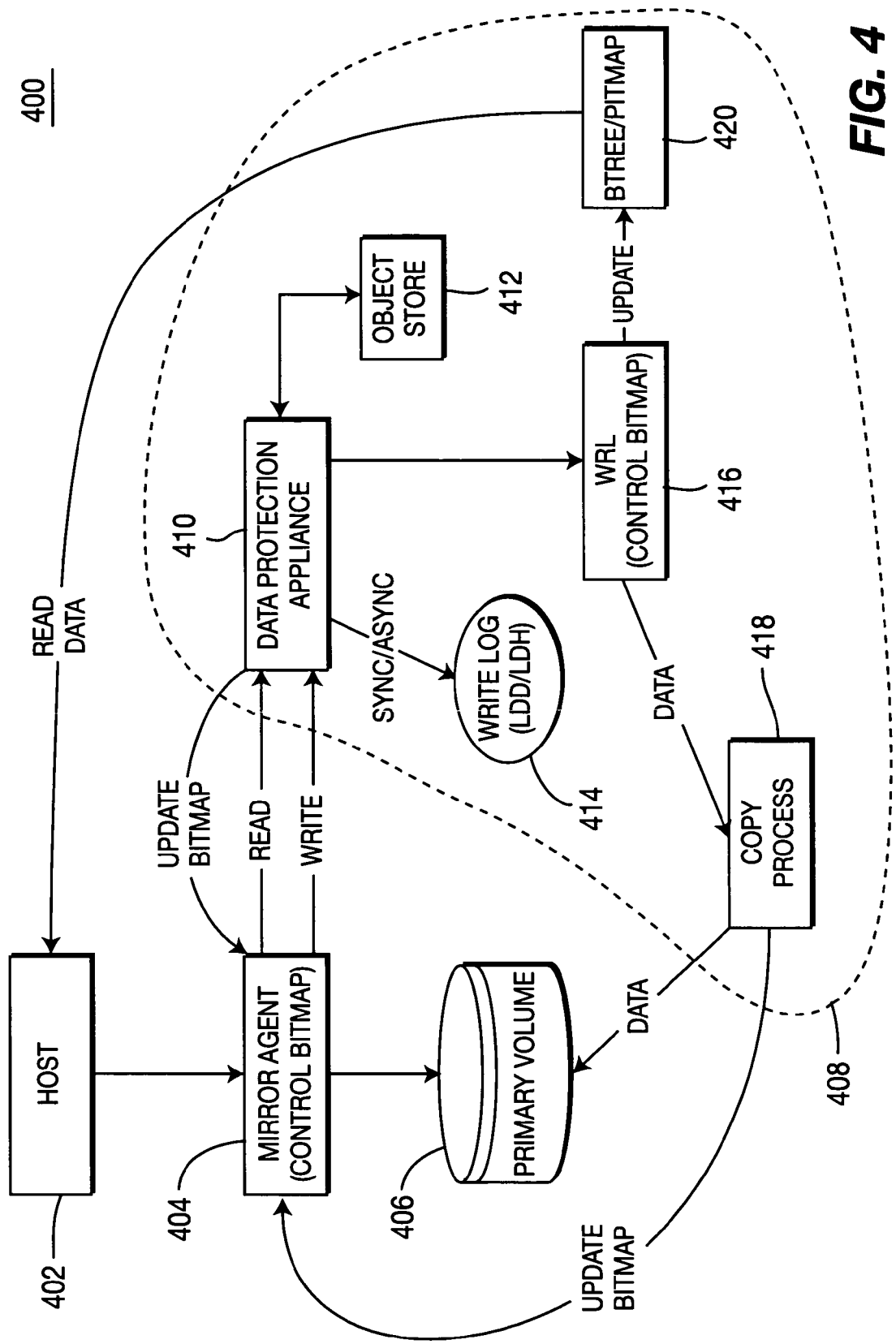
FIG. 4 is a block diagram of a system configured to perform a full restore process.

FIG. 4 is a block diagram of a system 400 configured to perform a full restore process. A host 402 sends read/write requests through a mirror agent 404, which includes a control bitmap. The mirror agent 404 accesses either a primary volume 406 or a data protection system 408 to satisfy the read/write requests. The mirror agent 404 can reside on the host 402, on a standalone device, or on a storage switch (not shown). The data protection system 408 includes a data protection appliance 410, a journaled object store 412, a write log 414, a WRL 416 with a control bitmap, a copy process 418, and a binary tree (BTree) data structure and a PIT map 420. The copy process 418 can be a software process or a separate hardware device, depending on the implementation. The operation of the system 400 is not affected if the copy process 418 is software or hardware. It is noted that while a BTree data structure has been disclosed, one skilled in the art could use other data structures to achieve a similar result.

The full restore process starts by presenting the desired primary volume image through the WRL 416 via the data protection appliance 410. Once a user elects to perform the full restore to the primary volume, the copy process starts by copying the data from the WRL 416 to the primary volume 406. This copying is performed by the copy process 418, which takes data from the WRL 416 and copies it to the primary volume 406. The copy process 418 is continuously running in the background, separate from any read/write activity that is occurring in the system 400.

As soon as the copy process starts, the primary volume image is available to the user for both reads and writes. This is achieved by intercepting all the read and write requests to the primary volume 406 by the mirror agent 404 and satisfying the requests using either the WRL 416 or the primary volume 406. The mirror agent 404 satisfies the read and write requests to the primary volume 406 based on whether the desired volume extent has been copied to the primary volume 406. An "extent" is a contiguous space on a volume, with a length that is defined by the underlying operating system. The mirror agent 404 is provided with a mirror control bitmap to determine where to perform the reads and writes (i.e., the WRL 416 or the primary volume 406). Each bit in the bitmap represents a region within the primary volume address space, and is updated whenever a region is completely copied to the primary volume 406.

A set bit in the control bitmap indicates that the region needs to be copied from the WRL 416 to the primary volume 406 and monitored for write activity. A clear bit in the control bitmap indicates that the region has already been copied to the primary volume 406 or will not be copied to the primary volume 406. As the full restore operation progresses, the copy control bitmap is updated and is periodically made persistent by saving it to the object store 412.

The control bitmap structure contains the information to describe the mirror control bitmap for the mirror agent 404, the WRL control bitmap for the WRL 416, and the copy control bitmap for the full restore process. The size of the control bitmap is not fixed, and depends on the number of regions and the region granularity. The control bitmap includes fields for a valid bit count, a region size, and region bits. The valid bit count field is the number of bits that are valid in the control bitmap. The region size field is the number of blocks (512 bytes) indicated per bit in the bitmap. The region bits field is an array of bits describing the regions. The region bits are indicated such that the LSB represents the lower region number and the MSB represents the higher region number. The upper MSB bits of the last element of the array may be unused.

If the extent being read has already been copied to the primary volume 406, then the read is performed from the primary volume 406. If the extent being read has not been copied to the primary volume 406, then the read is performed from the WRL 416.

All write requests from the host 402 are mirrored to both the primary volume 406 and the WRL 416. If the extent being written has already been copied to the primary volume 406, then the write is made to the primary volume 406 and an asynchronous write is made to the WRL 416. If the extent is being written has not been copied to the primary volume 406, then the write is synchronously made to both the primary volume 406 and the WRL 416. The write is not acknowledged to the host 402 until the primary volume write and the WRL write are completed. If the mirror agent 404 cannot write to the WRL 416, it must block all the writes to the primary volume 406. If a write to the primary volume 406 is blocked for longer than a predetermined timeout period, then the entire process is aborted. In such circumstances, the restore process will need to be restarted, and will resume from the last saved point.

Table 1 shows an example of how the mirror control bitmap can be used to indicate which extents have been copied from the WRL 416 to the primary volume 406. It is noted that one skilled in the art can envision other means of tracking the status the copy process from the WRL 416 to the primary volume 406.

TABLE 1

| I/O Type | Bit Set | Bit Clear |
| --- | --- | --- |
| Read | from WRL | from primary volume |
| Write | synchronously mirrored to WRL and primary volume | asynchronously mirrored to WRL and primary volume |

During the copy process, the data protection appliance 410 maintains a write log 414 for all the regions that need to be copied. Whenever a write activity happens in a region, the activity count for that region is incremented. The region with the highest write activity count is selected for the next copy process. This early restoration of the "hot" regions (based on write activity) to the primary volume 406 helps the read performance, as future reads in the already copied regions can be performed directly from the primary volume 406.

The data protection appliance 410 provides both read and write access to the underlying data. For the writes, it acts like a regular write log device. It uses an LDD (LogDataDmap) and an LDH (LogDataHeader) to keep track of the writes (shown as part of the write log 414). The LDD is the secondary data area where the write data is placed and the LDH is the mapping describing a write in the LDD. In order to allow the read access, the writes are tracked inside a BTree 420. Reads are satisfied from the BTree 420 and the underlying PIT map.

The LDH updates can be either synchronous or asynchronous. The data protection appliance 410 is provided with a bitmap to control the LDH updates. Each bit in the control bitmap represents a region within the primary volume address space. A set bit in the control bitmap (indicating that the region is being copied or will be copied) indicates that the LDH is updated synchronously and the BTree is updated. A clear bit in the control bitmap (indicating that the region has been copied or will not be copied) indicates that the LDH is updated asynchronously and the BTree is not updated.

During a full restore operation, the host access to the WRL is disabled. The WRL control bitmap for the WRL 416 is described in Table 2.

TABLE 2

| I/O Type | Bit Set | Bit Clear |
| --- | --- | --- |
| Write | synchronous LDH update | asynchronous LDH update |
| Read | PIT map and BTree | invalid |

Full Restore to a New Primary Volume

Figure 5A:
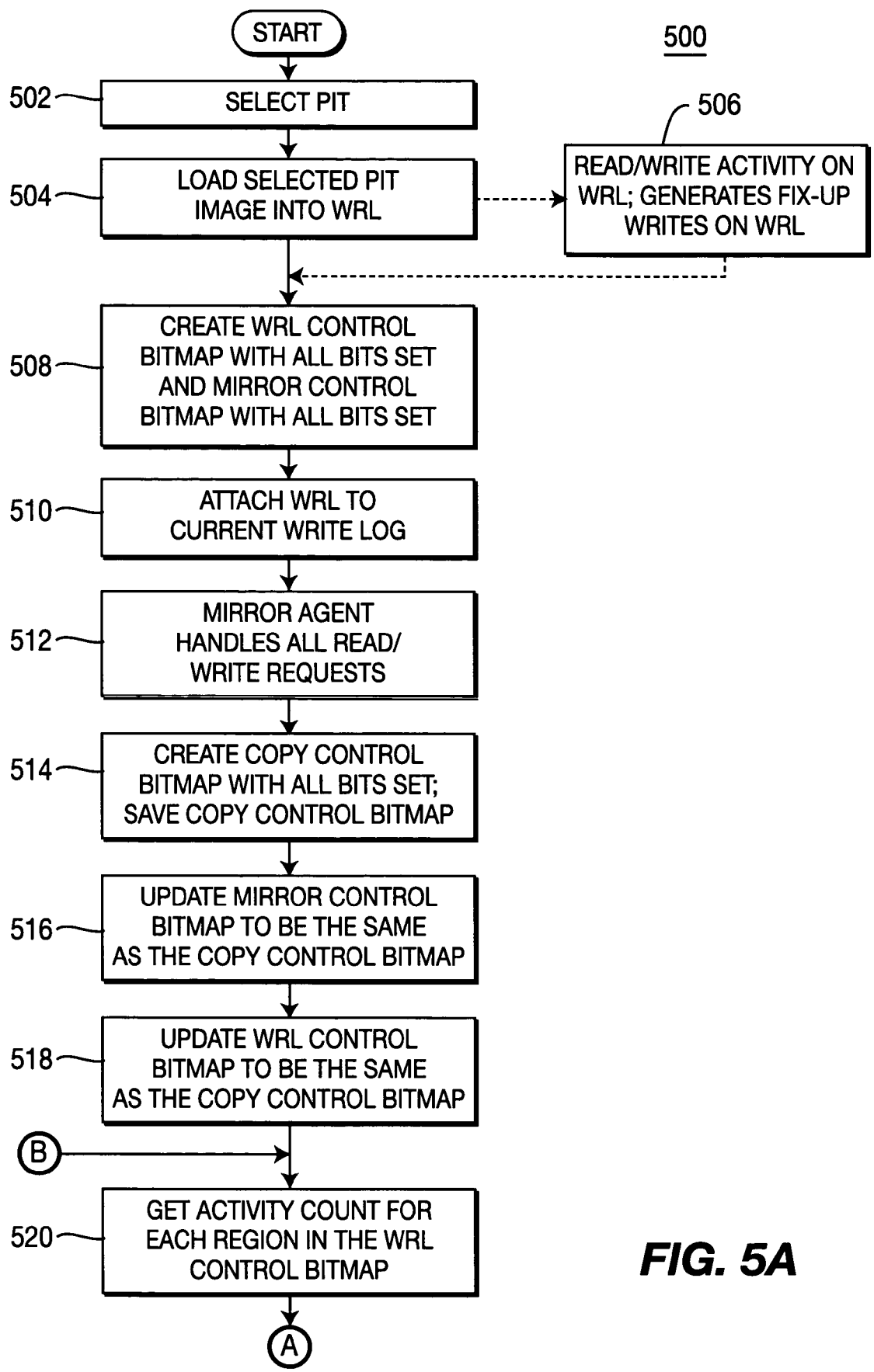
FIGS. 5A-5B are flowcharts of a method for performing a full restore to a new primary volume.
Figure 5B:
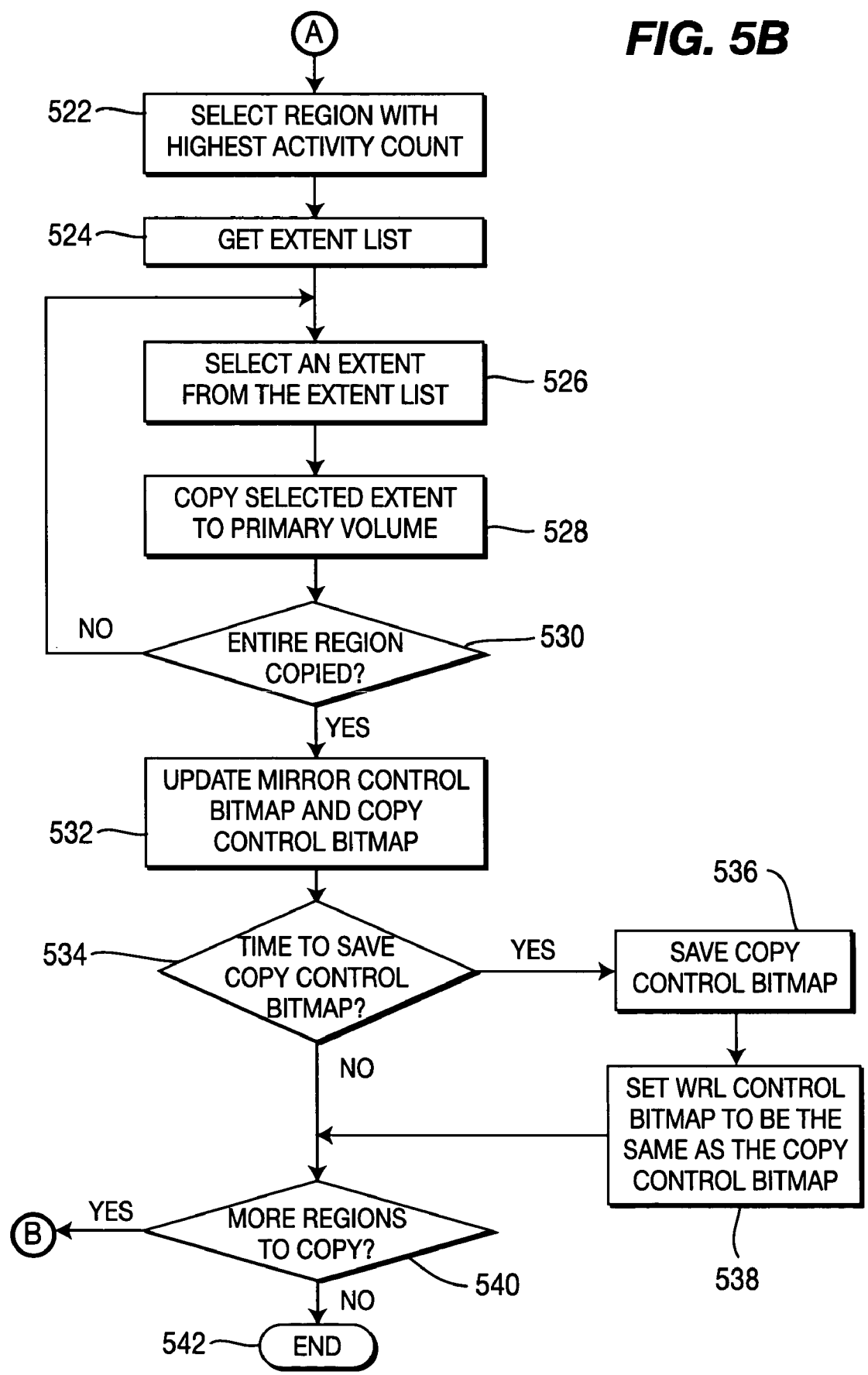
Figure 6:
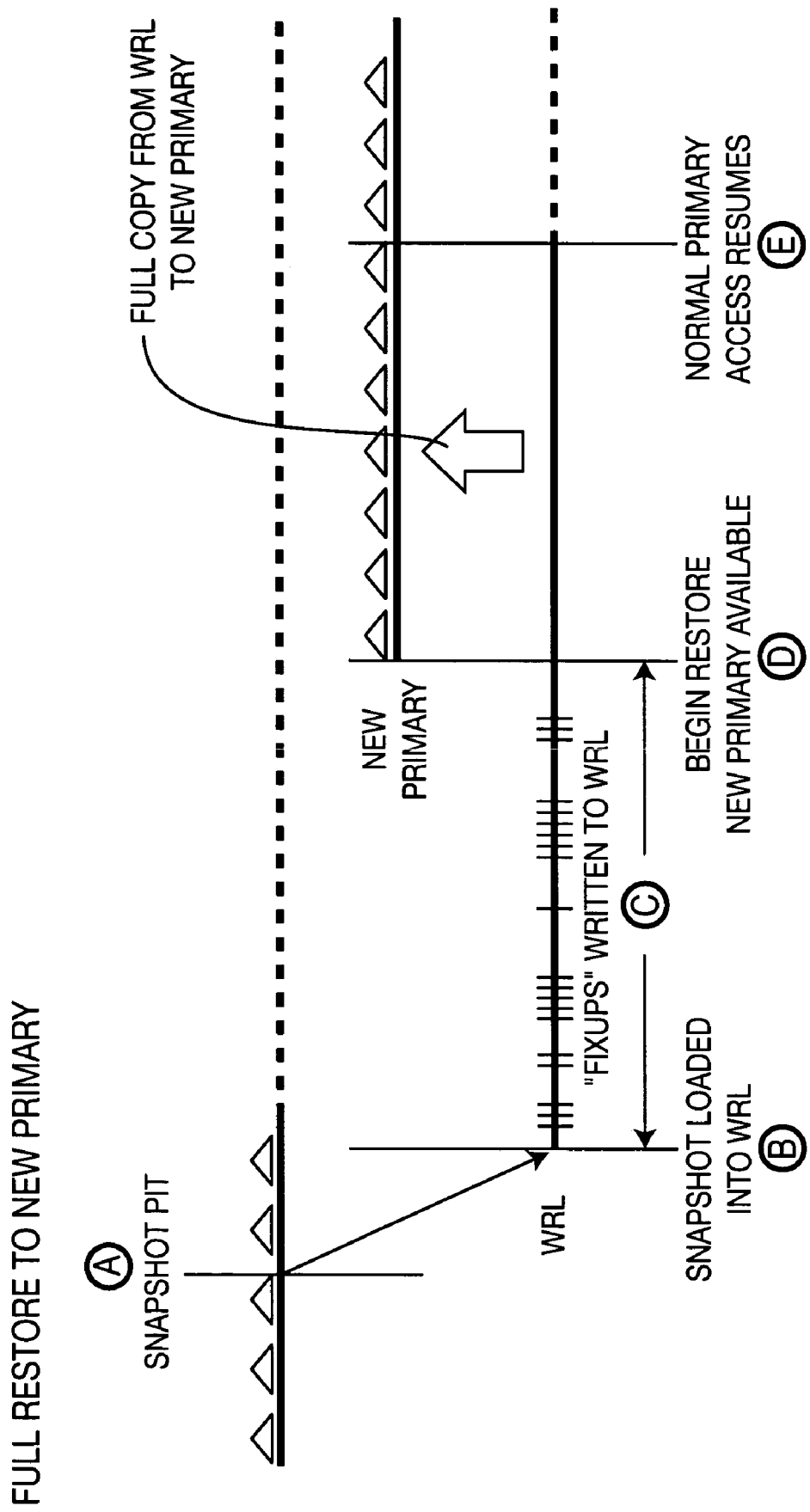
FIG. 6 is a diagram of performing a full restore to a new primary volume.

FIG. 5 is a flowchart of a method 500 for performing a full restore to a new primary volume. The method 500 is also shown diagrammatically in FIG. 6; the following discussion references both FIGS. 5 and 6. The method 500 begins with a user selecting a PIT that they wish to restore to (step 502; point A in FIG. 6). The selected PIT image is loaded into the WRL and access to the WRL is enabled (step 504; point B in FIG. 6). The user can interact with the PIT image on the WRL by performing read/write activity, which generates "fix-up" writes on the WRL (step 506; point C in FIG. 6). This read/write activity can be performed without initiating the restore process, and is not required (this optional step is indicated by dashed lines).

Once the user initiates the restore process (point D in FIG. 6), a WRL control bitmap is created (stored in the WRL) with all bits set and a mirror control bitmap is created (stored in the mirror agent) with all bits set (step 508). Setting all the bits in the control bitmap indicates that all regions need to be copied. The WRL is attached to the current write log to track all writes to the WRL (step 510). From this point forward, the mirror agent handles all read/write requests (step 512; this process is explained in greater detail in connection with FIG. 7). A copy control bitmap is created, with all bits set and the copy control bitmap is saved (step 514). The mirror control bitmap is updated to be the same as the copy control bitmap (step 516). The WRL control bitmap is updated to be the same as the copy control bitmap (step 518). These last two steps are performed to ensure that all of the control bitmaps reflect the current state of the restore procedure.

An activity count for each region indicated by the WRL control bitmap is obtained (step 520). The region with the highest activity count is selected (step 522). While the activity count for a region is used as a criterion for selecting a region in a preferred embodiment, the regions can be copied in any order depending upon the priority, I/O load, or any other criterion.

An extent list for the selected region is obtained (step 524). When performing a full restore to a new primary volume, the extent list is a single extent describing the selected region. An extent from the extent list is selected (step 526). The selected extent is copied to the primary volume (step 528). A determination is made whether the entire selected region has been copied to the primary volume (step 530). If the entire region has not been copied, then the next extent is selected from the extent list (step 526) and the method continues as described above.

If the entire region has been copied (step 530), then update the mirror control bitmap and the copy control bitmap to reflect the current state of the restore procedure (step 532). Next, a determination is made whether it is time to save the copy control bitmap (step 534). The copy control bitmap is saved to the object store when the amount of data copied (restored) exceeds 1 GB. It is noted that the 1 GB threshold is exemplary, and can vary based on the preferred implementation. If it is time to save the copy control bitmap, the copy control bitmap is saved (step 536). The WRL control bitmap is set to be the same as the copy control bitmap, to reflect the current state of the restore procedure (step 538).

If it is not time to save the copy control bitmap (step 534) or after the WRL control bitmap has been updated (step 538), a determination is made whether there are more regions to be copied to the primary volume (step 540). If there are more regions to copy, then the activity count for each region indicated by the WRL control bitmap is obtained (step 520) and the method continues as described above. If there are no more regions to copy to the primary volume (step 540), then the method terminates and normal access to the primary volume resumes (step 542; point E in FIG. 6).

Mirror Agent Handling Read/Write Requests

Figure 7:
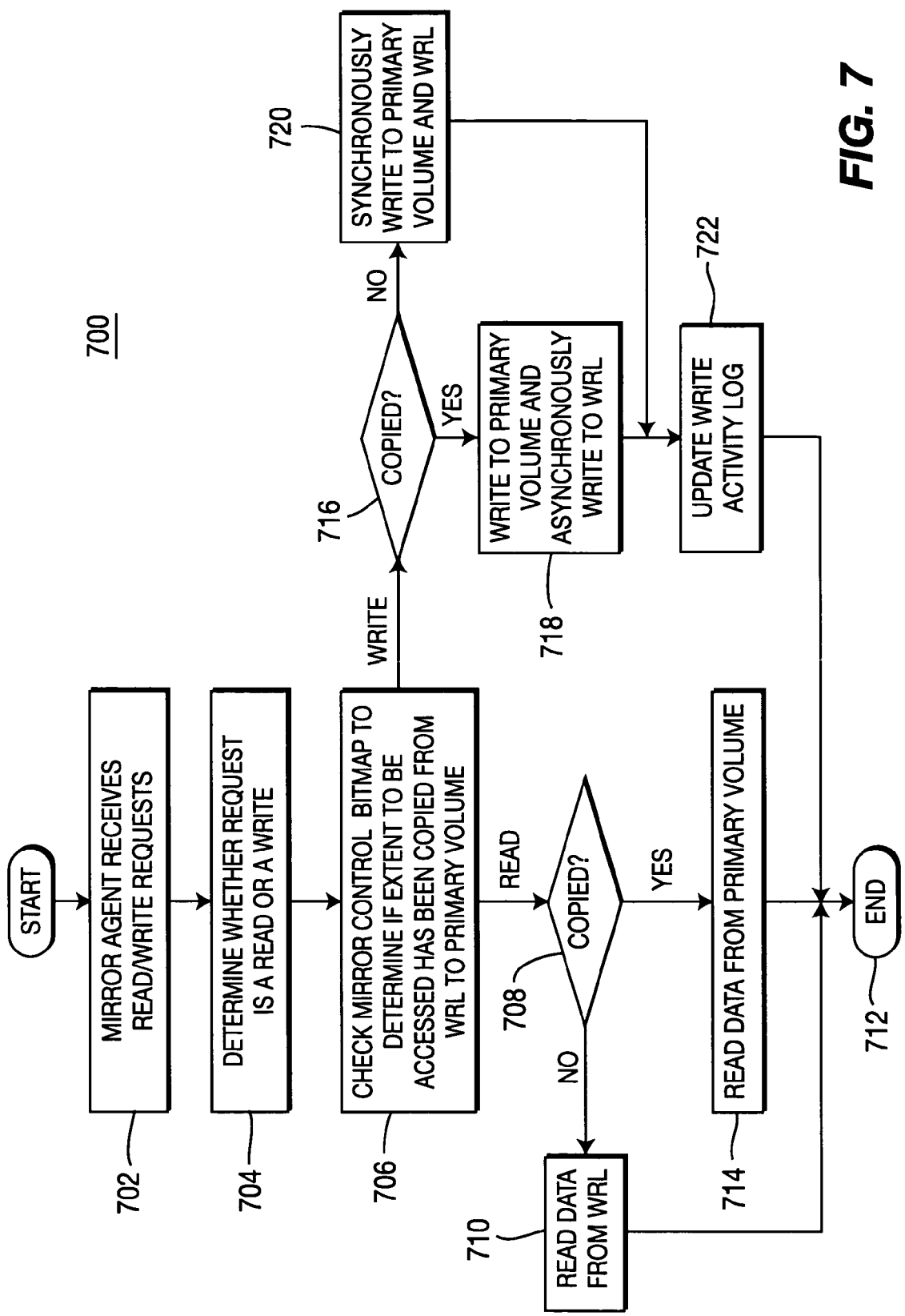
FIG. 7 is a flowchart of a method for a mirror agent handling read/write requests.

FIG. 7 is a flowchart of a method 700 for a mirror agent handling read/write requests. The method 700 begins by the mirror agent receiving a read/write request from the host (step 702). A determination is made whether the request is a read or a write (step 704). The mirror agent checks the mirror control bitmap to determine if the extent to be accessed has been copied from the WRL to the primary volume (step 706). It is noted that steps 704 and 706 can be reversed without affecting the overall operation of the method 700.

If the access to the extent is a read operation, then a determination is made whether the extent has been copied from the WRL to the primary volume (step 708). If the extent has not been copied to the primary volume, then the data is read from the WRL (step 710), and the method terminates (step 712). If the extent has been copied to the primary volume (step 708), then the data is read from the primary volume (step 714), and the method terminates (step 712).

If the access to the extent is a write operation, then a determination is made whether the extent has been copied from the WRL to the primary volume (step 716). If the extent has been copied to the primary volume, then the write is made to the primary volume and asynchronously to the WRL (step 718). If the extent has not been copied to the primary volume (step 716), then synchronously write to the primary volume and to the WRL (step 720).

After the write has been made (either at step 718 or step 720), the write activity log is updated (step 722), and the method terminates (step 712).

Full Restore to an Original Primary Volume

Figure 8A:
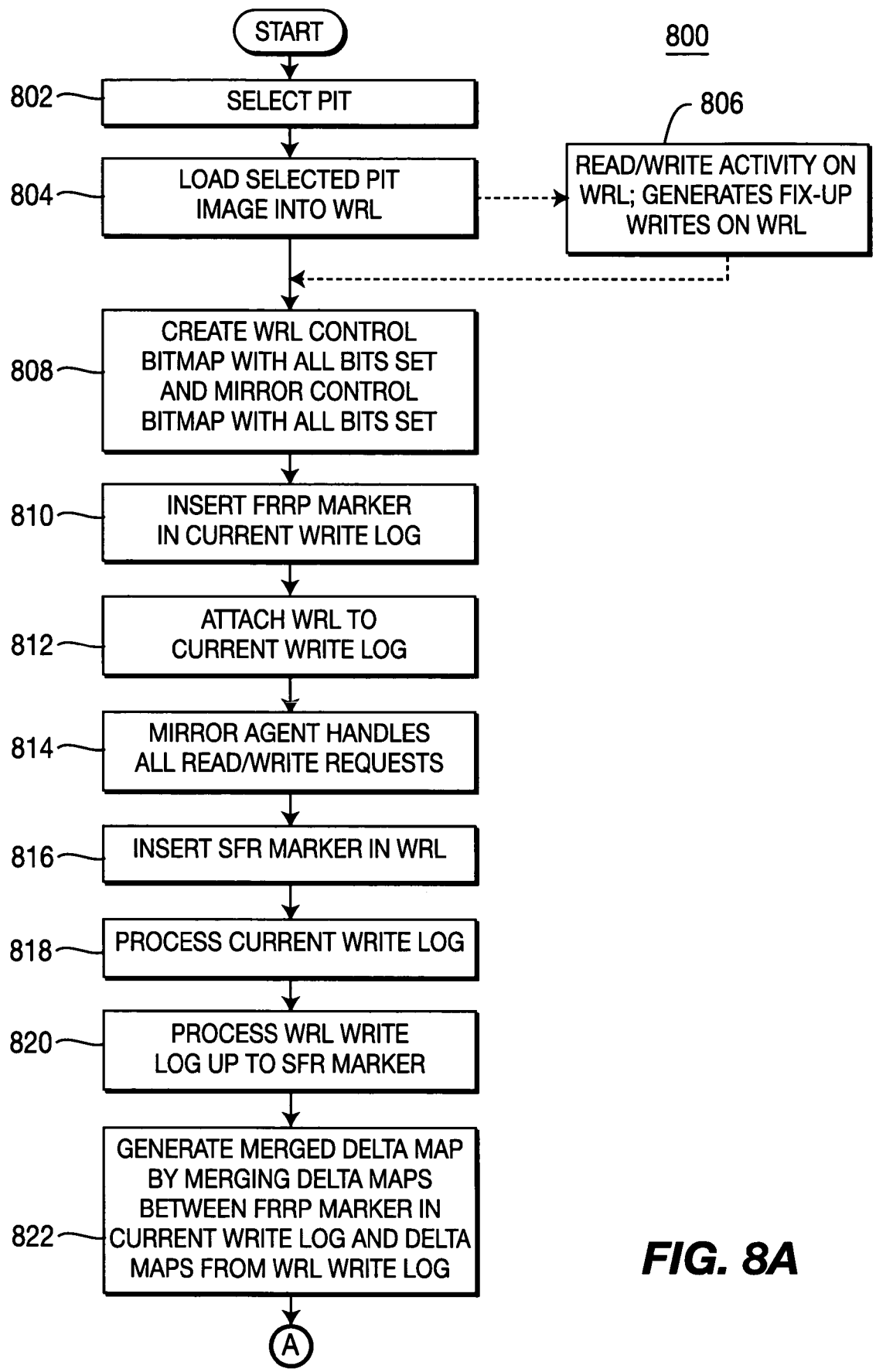
FIGS. 8A-8C are flowcharts of a method for performing a full restore to an original primary volume.
Figure 8B:
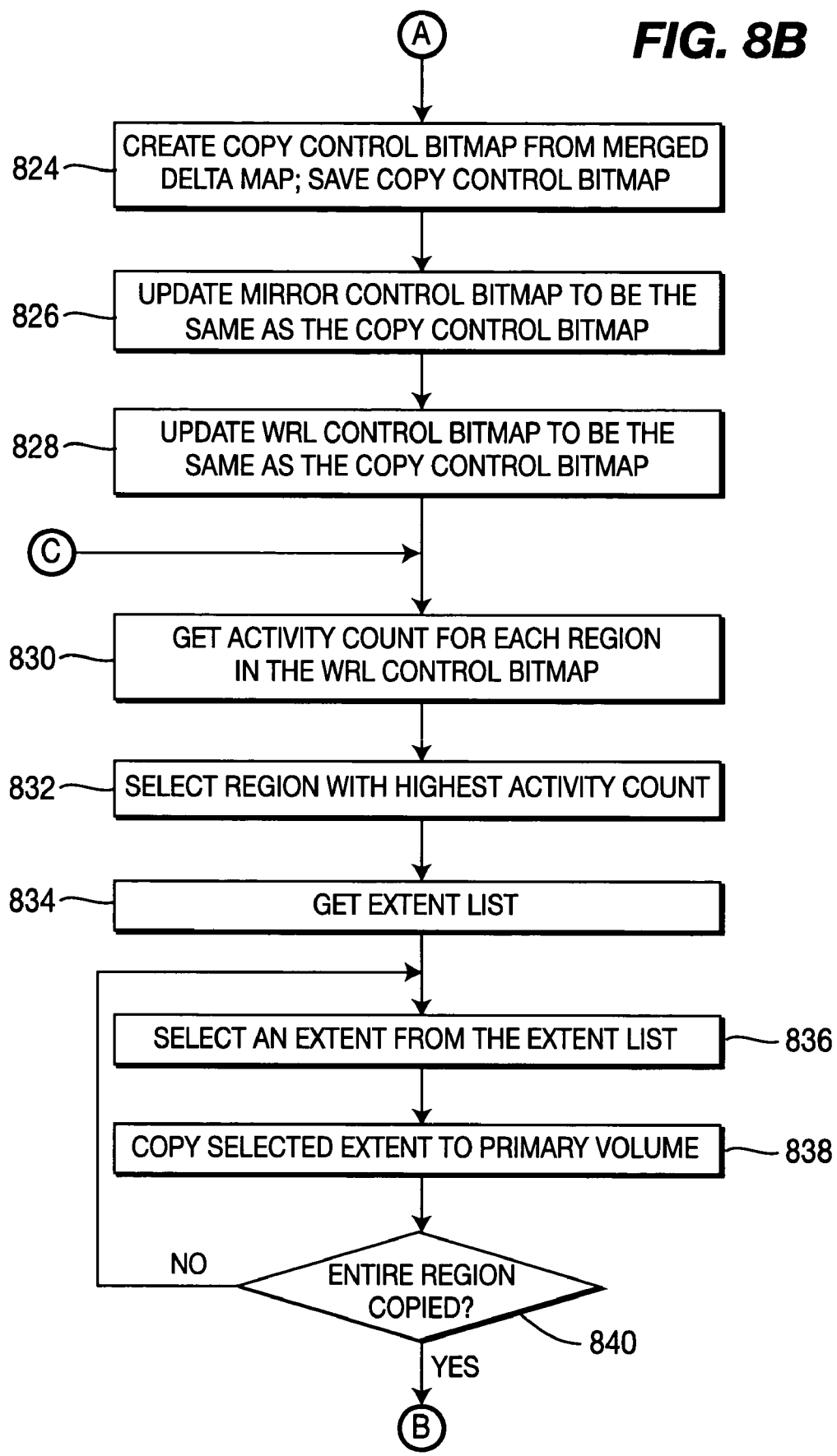
Figure 8C:
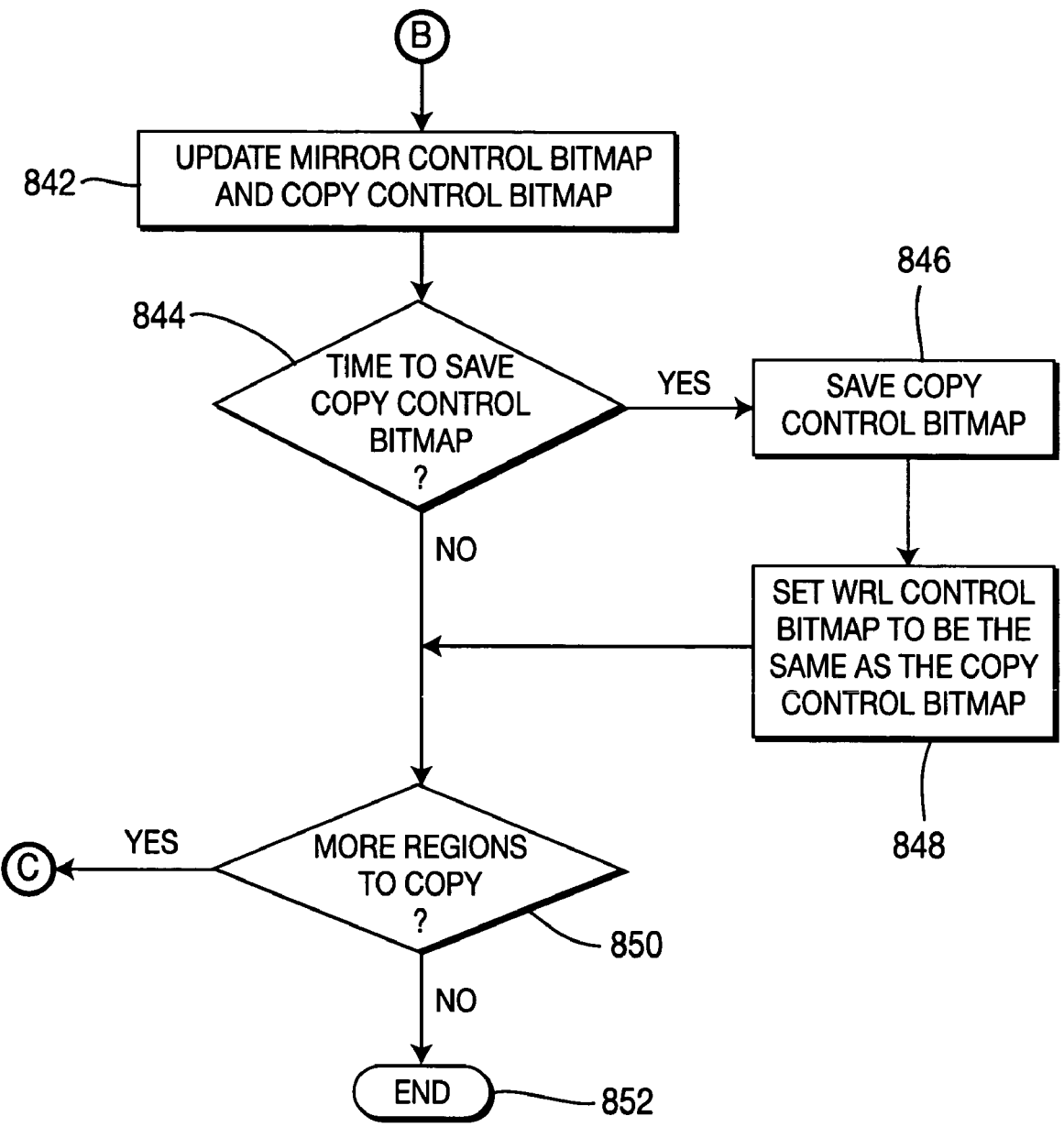

FIG. 8 is a flowchart of a method 800 for performing a full restore to an original primary volume. The method 800 is also shown diagrammatically in FIG. 9; the following discussion references both FIGS. 8 and 9. The method 800 begins with a user selecting a PIT that they wish to restore to (step 802; point A in FIG. 9). It is noted that while user actions are described as a part of the method 800, the user actions could be substituted with input from other software or hardware. The selected PIT image is loaded into the WRL and access to the WRL is enabled (step 804; point B in FIG. 9). The user can interact with the PIT image on the WRL by performing read/write activity, which generates "fix-up" writes on the WRL (step 806; point C in FIG. 9). This read/write activity can be performed without initiating the restore process, and is not required (this optional step is indicated by dashed lines).

Once the restore process is initiated (point D in FIG. 9), a WRL control bitmap is created (stored in the WRL) with all bits set and a mirror control bitmap is created (stored in the mirror agent) with all bits set (step 808). A full restore recovery point (FRRP) marker is inserted into the current write log(step 810). The WRL is attached to the current write log to track all writes to the WRL (step 812). From this point forward, the mirror agent handles all read/write requests (step 814; this process is explained in greater detail in connection with FIG. 7).

A start full restore (SFR) marker is inserted into the WRL (step 816). The current write log is processed (step 818) and the WRL write log is processed up to the SFR marker (step 820). A merged delta map is generated by merging delta maps between the FRRP marker in the current write log and the delta maps from the WRL write log(shown as "delta map containing WRL fix-ups" in FIG. 9; step 822).

Figure 9:
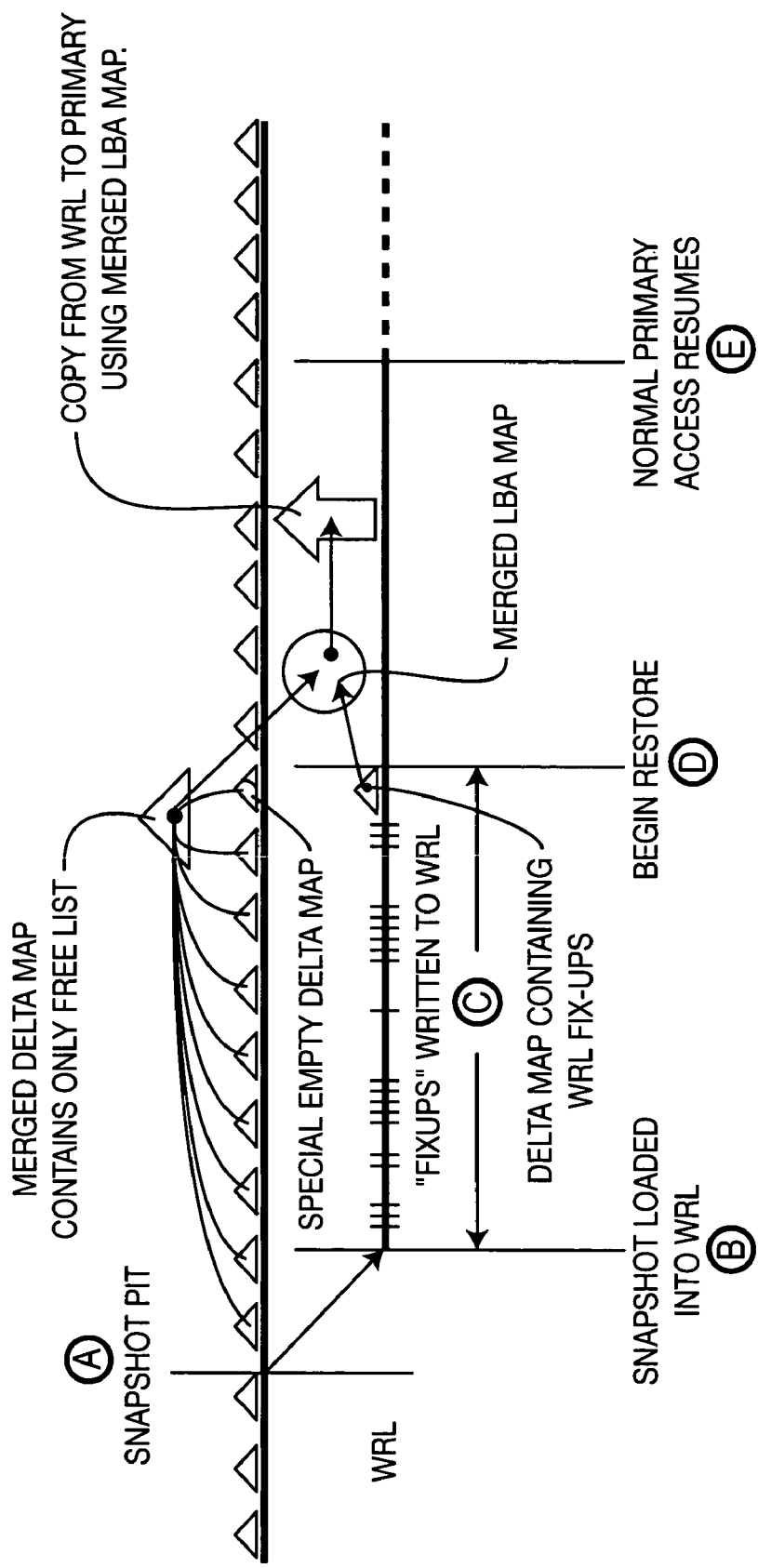
FIG. 9 is a diagram of performing a full restore to an original primary volume.

The "special empty delta map" in FIG. 9 is used in this step to maintain delta map chain consistency. The resulting merged delta map includes blocks that will not be needed once the restore process has completed. These blocks are moved into a free list, so that they can be freed for later use after the restore process has completed. The merged LBA (logical block address) map shown in FIG. 9 includes the LBAs of the primary volume that need to be maintained, because only those LBAs have changed and the remainder of the primary volume is the same. The LBA map is a list of LBAs that need to be copied from the WRL to the primary volume.

A copy control bitmap is created from the merged delta map, and the copy control bitmap is saved (step 824). The mirror control bitmap is updated to be the same as the copy control bitmap (step 826). The WRL control bitmap is updated to be the same as the copy control bitmap (step 828). These last two steps are performed to ensure that all of the control bitmaps reflect the current state of the restore procedure.

An activity count for each region indicated by the WRL control bitmap is obtained (step 830). The region with the highest activity count is selected (step 832). While the activity count for a region is used as a criterion for selecting a region in a preferred embodiment, the regions can be copied in any order depending upon the priority, I/O load, or any other criterion.

An extent list for the selected region is obtained by retrieving it from the object store (step 834). When performing a full restore to an original primary volume, the extent list is the list of defined extents within the selected region of the merged delta map. The extent list is stored in sequential order based on the primary block number. An extent from the extent list is selected by selecting the first extent based on the primary block number (step 836). The selected extent is copied to the primary volume (step 838). A determination is made whether the entire selected region has been copied to the primary volume (step 840). This determination is made by the extent list returning a NULL value, indicating that the list is empty. If the entire region has not been copied, then the next extent from the extent list is selected based on the next sequential primary block number (step 836) and the method continues as described above.

If the entire region has been copied (step 840), then update the mirror control bitmap and the copy control bitmap to reflect the current state of the restore procedure (step 842). Next, a determination is made whether it is time to save the copy control bitmap (step 844). The copy control bitmap is saved to the object store when the amount of data copied (restored) exceeds 1 GB. It is noted that the 1 GB threshold is exemplary, and can vary based on the preferred implementation. If it is time to save the copy control bitmap, the copy control bitmap is saved to the object store (step 846). The WRL control bitmap is set to be the same as the copy control bitmap to reflect the current state of the restore procedure (step 848).

If it is not time to save the copy control bitmap (step 844) or after the WRL control bitmap has been updated (step 848), a determination is made whether there are more regions to be copied to the primary volume (step 850). If there are more regions to copy, then the activity count for each region indicated by the WRL control bitmap is obtained (step 830) and the method continues as described above. If there are no more regions to copy to the primary volume (step 850), then the method terminates and normal access to the primary volume resumes (step 852; point E in FIG. 9).

Restart/Abort the Full Restore Procedure

If it becomes necessary to restart the full restore procedure, the WRL control bitmap is set to the last saved copy of the copy control bitmap. The mirror control bitmap is then set to be the same as the WRL control bitmap. The restore procedure then continues with step 520 for a restore to a new primary volume or step 830 for a restore to an original primary volume.

If the currently running full restore procedure is aborted (either by a user or other means), a new PIT is selected and the current restore operation is aborted. The restore procedure is then restarted at step 504 for a restore to a new primary volume or step 804 for a restore to an original primary volume. If this is an aborted rollback operation (restore to an original primary volume), then the merged delta map from the aborted full restore (which is retrieved from the object store) is merged with the new merged delta map in step 822.

While specific embodiments of the present invention have been shown and described, many modifications and variations could be made by one skilled in the art without departing from the scope of the invention. The above description serves to illustrate and not limit the particular invention in any way.

What is claimed is:

1. A method for restoring a volume in a continuous data protection system, comprising the steps of:
    selecting a volume to restore, the selected volume including at least one extent, wherein each said extent is a contiguous space on the selected volume;
    loading the selected volume into a workspace;
    copying the selected volume from the workspace to a restore location, including copying each said extent from the workspace to the restore location;
    performing operations on the selected volume while the copying step is being performed, wherein an operation can be performed on an extent of the selected volume regardless of whether the extent has been copied yet from the workspace to the restore location; and
    accessing the selected volume on the restore location once the copying step is complete.

2. The method according to claim 1, wherein the selected volume is a point in time image of a volume at a previous point in time.

3. The method according to claim 1, wherein the copying step includes using a bitmap to indicate whether an extent has been copied from the workspace to the restore location.

4. The method according to claim 1, wherein the copying step includes copying the extents in an order based on a predetermined criterion.

5. The method according to claim 4, wherein the predetermined criterion is an amount of write activity to an extent and an extent with the highest amount of write activity is copied first.

6. The method according to claim 1, wherein the performing step includes using a mirror agent to determine whether the operation on the selected volume should be performed at the workspace or at the restore location.

7. The method according to claim 6, wherein if the operation is a read,
    the data is read from the workspace if the extent has not been copied to the restore location; and
    the data is read from the restore location if the extent has been copied to the restore location.

8. The method according to claim 6, wherein if the operation is a write,
    the data is written synchronously to the workspace and the restore location if the extent has not been copied to the restore location; and
    the data is written to the restore location and asynchronously to the workspace if the extent has been copied to the restore location.

9. A system for restoring a volume in a continuous data protection system, comprising:
    a host device;
    a restore location on which a selected volume is to be restored, the selected volume including at least one extent, wherein each said extent is a contiguous space on the selected volume;
    a workspace in the data protection system, configured to receive the selected volume;
    copying means for copying the selected volume from said workspace to said restore location, including copying each said extent from the workspace to the restore location; and
    operating means for performing an operation from said host device on the selected volume while the selected volume is being copied from said workspace to said restore location, wherein an operation can be performed on an extent of the selected volume regardless of whether the extent has been copied yet from the workspace to the restore location.

10. The system according to claim 9, wherein the selected volume is a point in time image of a volume at a previous point in time.

11. The system according to claim 9, wherein said copying means includes a bitmap to indicate whether an extent has been copied from said workspace to said restore location.

12. The system according to claim 9, wherein said copying means copies the extents in an order based on a predetermined criterion.

13. The system according to claim 12, wherein the predetermined criterion is an amount of write activity to an extent and an extent with the highest amount of write activity is copied first.

14. The system according to claim 9, wherein said operating means includes a mirror agent configured to determine whether the operation on the selected volume should be performed at said workspace or at said restore location.

15. The system according to claim 14, wherein if the operation is a read,
    the data is read from said workspace if the extent has not been copied to said restore location; and
    the data is read from said restore location if the extent has been copied to said restore location.

16. The system according to claim 14, wherein if the operation is a write,
- the data is written synchronously to said workspace and said restore location if the extent has not been copied to said restore location; and
- the data is written to said restore location and asynchronously to said workspace if the extent has been copied to said restore location.

17. A computer-readable storage medium containing a set of instructions for execution by a machine, the set of instructions comprising:
- a selecting code segment for selecting a volume to restore, the selected volume including at least one extent, wherein each said extent is a contiguous space on the selected volume;
- a loading code segment for loading the selected volume into a workspace;
- a copying code segment for copying the selected volume from the workspace to a restore location, wherein said includes copying each said extent from the workspace to the restore location;
- an operation code segment for performing operations on the selected volume while the selected volume is being copied, wherein an operation can be performed on an extent of the selected volume regardless of whether the extent has been copied yet from the workspace to the restore location; and
- an accessing code segment for accessing the selected volume on the restore location once the selected volume has been copied.

18. The storage medium according to claim 17, wherein the selected volume is a point in time image of a volume at a previous point in time.

19. The storage medium according to claim 17, wherein said copying code segment includes a bitmap to indicate whether an extent has been copied from the workspace to the restore location.

20. The storage medium according to claim 17, wherein said copying code segment includes copying the extents in an order based on a predetermined criterion.

21. The storage medium according to claim 20, wherein the predetermined criterion is an amount of write activity to an extent and an extent with the highest amount of write activity is copied first.

22. The storage medium according to claim 17, wherein said operation code segment includes a mirror agent to determine whether the operation on the selected volume should be performed at the workspace or at the restore location.

23. The storage medium according to claim 22, wherein if the operation is a read,
- the data is read from the workspace if the extent has not been copied to the restore location; and
- the data is read from the restore location if the extent has been copied to the restore location.

24. The storage medium according to claim 22, wherein if the operation is a write,
- the data is written synchronously to the workspace and the restore location if the extent has not been copied to the restore location; and
- the data is written to the restore location and asynchronously to the workspace if the extent has been copied to the restore location.

25. A system for restoring a volume in a continuous data protection system, comprising:
- a host device;
- a restore location on which a selected volume is to be restored, the selected volume including at least one extent, wherein each said extent is a contiguous space on the volume;
- a workspace in the data protection system, configured to receive the selected volume;
- a copying device, configured to copy the selected volume from said workspace to said restore location, by copying each said extent from the workspace to the restore location; and
- a processor, configured to perform an operation from said host device on the selected volume while the selected volume is being copied from said workspace to said restore location, wherein an operation can be performed on an extent of the selected volume regardless of whether the extent has been copied yet from the workspace to the restore location.

26. The system according to claim 25, wherein the selected volume is a point in time image of a volume at a previous point in time.

27. The system according to claim 25, wherein said copying device includes a bitmap to indicate whether an extent has been copied from said workspace to said restore location.

28. The system according to claim 25, wherein said copying device copies the extents in an order based on a predetermined criterion.

29. The system according to claim 28, wherein the predetermined criterion is an amount of write activity to an extent and an extent with the highest amount of write activity is copied first.

30. The system according to claim 25, wherein said processor includes a mirror agent configured to determine whether the operation on the selected volume should be performed at said workspace or at said restore location.

31. The system according to claim 30, wherein if the operation is a read,
- the data is read from said workspace if the extent has not been copied to said restore location; and
- the data is read from said restore location if the extent has been copied to said restore location.

32. The system according to claim 30, wherein if the operation is a write,
- the data is written synchronously to said workspace and said restore location if the extent has not been copied to said restore location; and
- the data is written to said restore location and asynchronously to said workspace if the extent has been copied to said restore location.

* * * * *

UNITED STATES PATENT AND TRADEMARK OFFICE
CERTIFICATE OF CORRECTION

PATENT NO. : 7,650,533 B1  Page 1 of 1
APPLICATION NO. : 11/408198
DATED : January 19, 2010
INVENTOR(S) : Saxena et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Twenty-third Day of November, 2010

David J. Kappos
*Director of the United States Patent and Trademark Office*